Dec. 31, 1963 M. V. WILSON 3,116,414
GASEOUS FISSION PRODUCTS ABSORPTION IN LIQUID FOR MEASUREMENT
Filed July 21, 1960
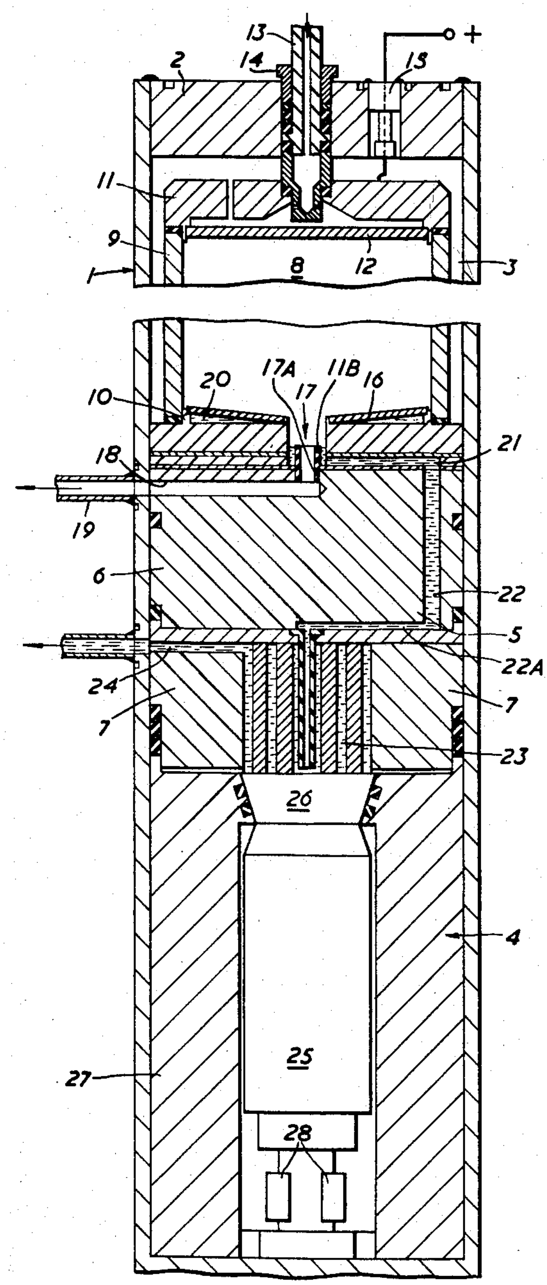

United States Patent Office 3,116,414
Patented Dec. 31, 1963

3,116,414
GASEOUS FISSION PRODUCTS ABSORPTION IN LIQUID FOR MEASUREMENT

Murray Vincent Wilson, Northampton, England, assignor to The Plessey Company Limited, London, England, a British company Filed July 21, 1960, Ser. No. 44,475
Claims priority, application Great Britain July 27, 1959
7 Claims. (Cl. 250—43.5)

This invention relates to systems designed for the detection of fission products and is primarily concerned with the detection of gaseous fission products, which may be present in the cooling circuits of nuclear reactors.

It is well known that in certain types of nuclear reactors the fuel elements are provided in containers which are introduced into the core of the reactor. When the containers are functioning correctly fission products are substantially wholly prevented from entering into the coolant streams of the reactor.

In the event of a rupture in one or more of the containers, fission products are able to escape into the coolant circuits of the reactor. The presence of such fission products in the coolant circuits constitutes a dangerous biological hazard. Several forms of monitoring systems have hitherto been proposed which are utilised to detect the presence of the fission products. Such previously known monitoring systems include ion exchange resins, dolay neutron monitors, gamma detectors, Cherenkev detectors, and gaseous fission product monitors, which latter by means of gas precipitation are capable of detecting the unstable solid daughter products of the gaseous fission products krypton and xenon.

The system to which the present application relates is of the latter mentioned type, viz, a gaseous fission product monitor using gas precipitation and is intended for application to both gas and water cooled reactors.

The gaseous fission products, krypton and xenon, are contained in a gas stream. In the case of a gas cooled reactor this stream is a sample flow from the reactor coolant and, in the case of a water cooled reactor is a compatible carrier gas into which the gaseous fission products have been transferred by a process known as "scrubbing" or "stripping."

The gas streams of either sort contain irradiation induced activity. In the case of coolant gas samples this activity is acquired during the passage of the gas through the reactor core. In the case of water cooled reactor carrier gas samples, the activity is mainly due to the transfer of active water vapour into the gas phase. For sensitive monitoring of the gaseous fission products it is necessary to collect their solid daughters and remove them from the active gas before measurements are made.

According to the present invention there is provided a method and apparatus for detecting the presence of fission materials carried in a gaseous phase and measuring their quantity by electrostatically precipitating the daughter products of the gaseous fission materials onto an inactive liquid medium in the presence of a gas phase and then transferring the liquid medium to an activity counting device shielded from the active gas phase.

The decay products contained in the water are undergoing beta decays, whereas most particles from an active coolant have only one stage of decay and hence being inactive when collected in the liquid phase. The counter employed must respond to beta particles in the presence of a general gamma background in order to discriminate in favour of the active solid daughter products.

It is proposed to precipitate the ionised decay solids onto a liquid surface. The liquid may be in the form of charged drops, charged jets or a surface film covering a suitably shaped electrode. For liquid films the electrode may be a cylinder, centrally situated in the precipitation chamber, or part of the precipitation chamber inner surface, charged with respect to the remainder of the chamber surface. The chamber size is such that a suitable transit time for the sample flow is obtained, and its shape is designed to be consistent with good electrostatic geometry.

After precipitation the liquid is allowed to drain into a shielded counting device. The liquid stream is delayed in this for a suitable period and secondary decay of the precipitated activity is measured. Proportional counters, scintillation counters or an assembly of Geiger tubes may be used for this purpose. The transit time or delay in the counting chamber is sufficiently long to produce an accurate measurement of the activity. The effluent liquid may be discarded or used again provided that a long recirculation time is used to allow previously collected activity to decay to a very low level.

For a better understanding of the invention one constructional form thereof will now be described in relation to the drawing accompanying the specification, which is a cross-sectional view of an embodiment of a combined precipitator, gas stripper and counting device.

The device includes a cylindrical pressure shell 1 which is formed from stainless steel. The upper end of the shell 1 is closed by stainless steel end plate 2. The shell 1 is divided into two main sections namely an upper section 3 and a lower section 4 by a relatively thick cylindrical block 5 of material such as lead which acts as the shielding for the radio-active products. The shielding block 5 comprises two relatively thick annular plates 6 and 7 respectively.

The upper section 3 contains a precipitation chamber 8 having a cylindrical wall which is made of a slightly electrically conducting material. The lower end of the cylindrical wall 9 is connected to the upper surface of the plate 6, the latter being provided with an upstanding flange 10 which abuts the inner surface of the wall 9. The upper end of the wall 9 is closed by a cap 11 which is utilised to support a sintered stainless steel porous disc 12.

A sample gas inlet pipe 13 connects with the interior of the precipitation chamber 8, via a tubular connector 14 which is formed from an electrically insulating material. The precipitating chamber 8 is connected with a source of electrical potential as is schematically indicated at 15. It will be understood that the chamber 8 is electrically insulated from the remainder of the pressure shell 1 by electrical insulation not separately identified by reference numerals. A dished sintered stainless steel porous plate 16 is located at the lowermost end of the chamber 8. The plate 16 has a central bore 17 which connects via a horizontally directed bore 18 with a gas outlet 19 provided in the wall of the shell 1. The shaping of the plate 16 is such as to form a chamber 20 which is defined by the underside of the plate 16, part of the upper surface of the plate 6 and the inner vertical wall of the flange 10. This chamber 20 connects with a fluid inlet duct (not shown). When fluid is introduced into the chamber 20 under a relatively small pressure head the fluid percolates through the porous plate 16 and flows into the bore 17 by reason of the inclination of the upper surface of the plate 16. The fluid is maintained separate from the gas flowing through the bore 17 by an annular insert **17*a* which forms the inner cylindrical wall of a small annular chamber 17*b* connecting with a horizontally directed fluid duct 21. The duct 21 connects with a vertical labyrinth 22, the latter serving to prevent direct radiation from the precipitation chamber 8 into the lower section 4 of the pressure shell. The outlet side of the labyrinth is connected via a fluid duct 22*a* to the inlet side of a phosphor chamber 23 provided in the plate 7. The phosphor chamber has a fluid outlet duct 24. The phosphor chamber 23 is associated with a scintillation counter 25 through the intermediary of a light guide 26. Both the scintillation counter 25 and the light guide 26 are housed in the lower section 4 of the pressure shell. A relatively massive radiation shielding block 27 is provided in the lower section 4 of the shell. The outlet from the counter is taken from the output connections 28** thereof.

Various sealing rings and the like are shown in the drawing; and these sealing rings have not been separately identified by reference numerals.

The above described apparatus is used as follows:

Electrostatic potentials are applied to the disc 12 and to the plate 16 which latter together form the electrodes of the precipitation chamber, positive voltage being applied to the disc 12. The cylindrical wall 9 is utilised to shape the electrostatic field between the electrodes. The gaseous sample which is to be monitored is introduced through the inlet 13 and percolates through the disc 12, the gas travelling downwardly through the precipitation chamber 8 towards the plate 16. Some of the gaseous fission products decay during their passage through the precipitation chamber 8, and solid daughter products are produced. These are heavily ionised at the time of decay and are attracted towards the sintered stainless steel plate 16. During the transit of the gas through the chamber 8 the water (that is water that has not been contaminated with fission products) introduced into the chamber 20 under a pressure head percolates through the plate 16 to form a water film on the upper surface of the plate 16, the water film draining towards the bore 17. The ionised decay solids are consequently precipitated onto a water surface and adhere or chemically combine with the water. The thus contaminated water is carried via the annular chamber **17*b*, the duct 21 and the labyrinth 22 into the phosphor chamber 23. The activity produced by subsequent decay of the solid fission products precipitated into the water irradiates the phosphor so that the latter is thereby caused to act as the light source for the scintillation counter 25. The contaminated water travels from the phosphor chamber 23 to the outlet 24**.

What I claim is:

1. Apparatus for detecting the presence of fission materials carried in a gaseous phase, and for measuring their quantity comprising a precipitation chamber for electrostatically precipitating the daughter products of the gaseous fission materials onto an inactive liquid medium in the presence of a gas, an activity counting device shielded from the active gas phase, and means for transferring the liquid medium containing the precipitated daughter products form the precipitation chamber to the activity counting device.

2. Apparatus as claimed in claim 1, wherein the liquid medium is in the form of a surface film covering an electrode surface.

3. Apparatus as claimed in claim 1 in which the precipitation chamber includes an electrode in the form of a porous plate, the liquid media being caused to percolate through the porous plate and to flow across the surface of the plate, so that the daughter products are precipitated onto the liquid during its transit across the plate.

4. Apparatus as claimed in claim 3, wherein the porous plate is a dished plate having a central aperture therein, the arrangement being such that the liquid media drains across the surface of the plate under the action of gravity to flow through said bore, and wherein the liquid which drains through said bore is arranged to be led into a chamber wherein means are provided for utilising the activity produced by subsequent decay of solid fission products contained in the liquid medium to convert said activity into further form of energy which is used to energise a counting device.

5. Appartaus as claimed in claim 1, wherein said chamber contains a phosphor unit, the arrangement being such that said subsequent decay of the solid fission products irradiates the latter so that the latter acts as a light source for a scintillation counter.

6. Apparatus as claimed in claim 3, wherein the gas phase is introduced into a precipitation chamber via a second porous plate.

7. Apparatus for detecting the presence of fission materials in a gaseous phase and for measuring their quantity, comprising a precipitation chamber for electrostatically prepicitating the daughter products of the gaseous fission materials on to an inactive liquid medium in the presence of a gas phase, including an electrode in the form of a dished annular porous plate, the liquid medium being caused to percolate through the porous plate from one surface to the other surface thereof and to flow across the said other surface of the plate, the daughter products being precipitated on to the liquid medium during its transit across the plate, an activity counting device shielded from the gas phase and means for transferring the liquid medium containing the precipitated gas products after their transit across said other plate surface from the interior of the precipitation chamber to the activity counting device.

References Cited in the file of this patent

UNITED STATES PATENTS

| | | |
|---|---|---|
| 2,576,616 | Livingston et al. | Nov. 27, 1951 |
| 2,652,497 | Miller | Sept. 15, 1953 |